Inventor.
A. Pritzker
By Egerton R. Case
Atty.

Nov. 11, 1924.

A. PRITZKER 1,514,628

ELECTRIC HEAT GENERATING APPLIANCE

Filed April 17, 1922   2 Sheets-Sheet 2

Inventor
*Asher Pritzker*

By *[signature]*

Attorney

Patented Nov. 11, 1924.

1,514,628

UNITED STATES PATENT OFFICE.

ASHER PRITZKER, OF TORONTO, ONTARIO, CANADA, ASSIGNOR TO THE NATIONAL ELECTRIC HEATING COMPANY, LIMITED, OF TORONTO, ONTARIO, CANADA.

ELECTRIC HEAT-GENERATING APPLIANCE.

Application filed April 17, 1922. Serial No. 554,070.

*To all whom it may concern:*

Be it known that I, ASHER PRITZKER, a subject of the King of Great Britain, of the city of Toronto, county of York, Province of Ontario, Canada, have invented certain new and useful Improvements in Electric Heat-Generating Appliances, of which the following is a specification.

My invention relates to improvements in electric heat-generating appliances such as cooking ranges, hot plates and electric heaters, and the objects of my invention are: Firstly, to make the supporting base for the resistor, or heating element, removable, so that particularly in the domestic field the housewife may readily remove an impaired or damaged resistor, and replace it by a fresh one, and thus avoid having to secure the services of an electrician for this purpose. Secondly, to place the supporting base for the resistor in a preferred location below the grid or means supporting the cooking utensil, so that the cooking utensil will not rest upon said base. Thirdly, in my preferred form of invention, to provide means whereby it will be impossible for the base carrying a resistor of a high wattage to be coupled to electrical connections of a low wattage, and fourthly, to distribute the heat as desired on the bottom of the cooking utensil so as to obtain the full benefit of the heat generated, and thus economize in current used, and in the following specification I shall describe and illustrate a disclosure within my invention, and what I claim as new will be set forth in the claims forming part of this specification.

Figure 1:
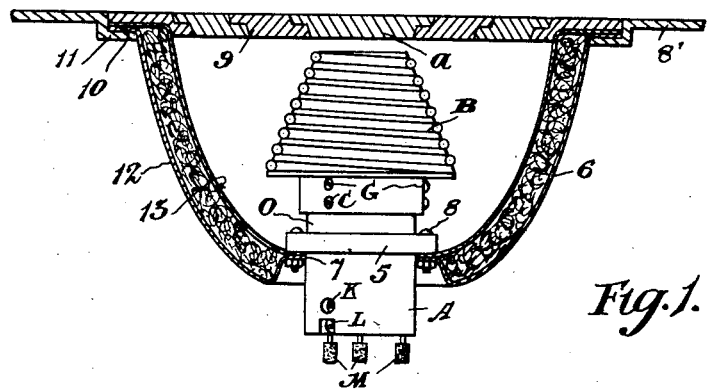
Figure 2:
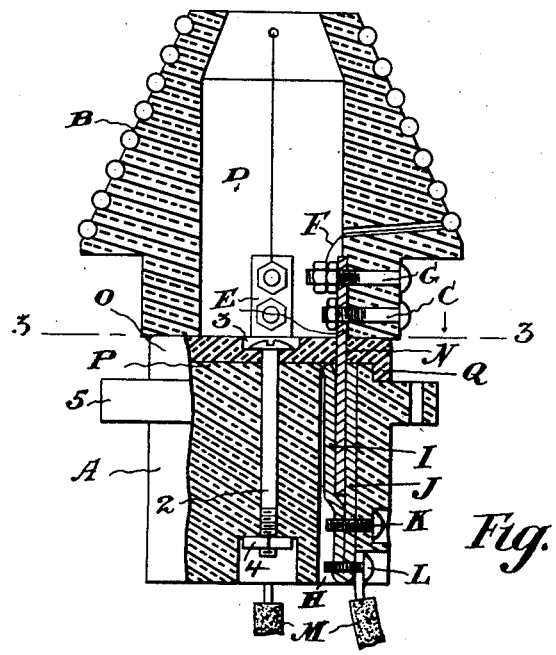
Figure 3:
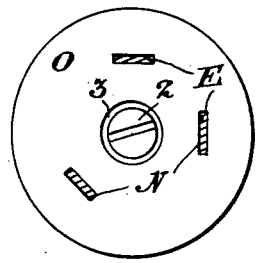
Figure 4:
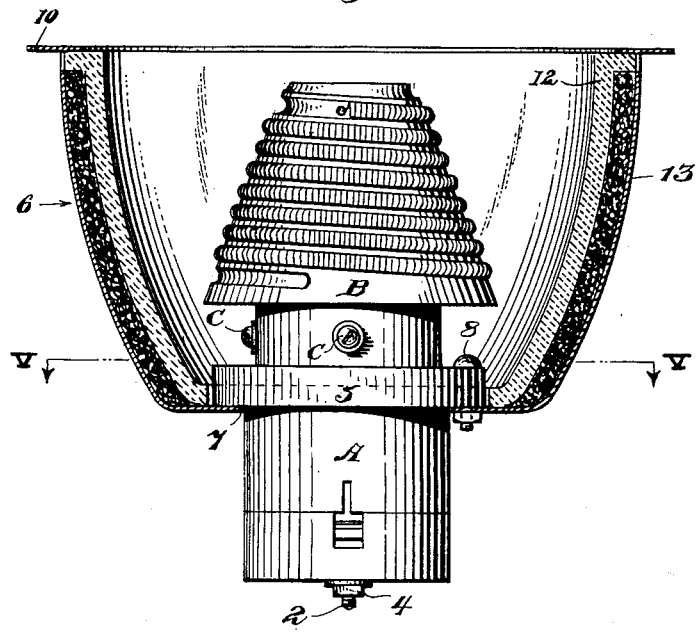
Figure 5:
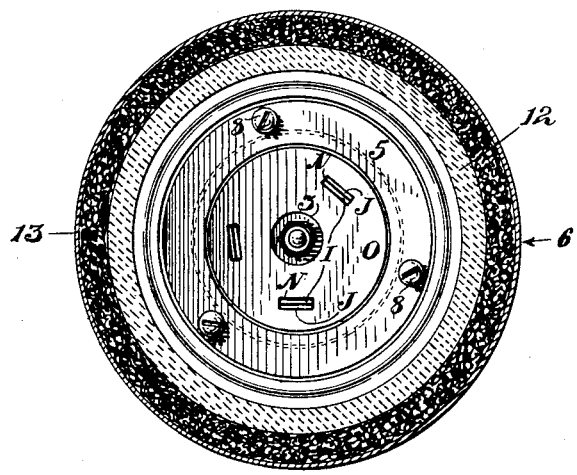

Fig. 1 is an elevation of my preferred form of invention, with parts shown in section, showing the same associated with a cooking range or hot plate, part of which is shown in section. Fig. 2 is a vertical central longitudinal section through the supporting base for the resistor, and the support therefor, provided with suitable electrical connections, and Fig. 3 is a horizontal cross-section on the line 3—3, Fig. 2. Fig. 4 is an elevation of my improved form of resistor base and support therefor, and the reflector or bowl employed for mounting the same in an electric cooking range, or the like, and Fig. 5 is a transverse sectional view taken upon the line V—V of Fig. 4.

In the drawings, like characters of reference refer to the same parts.

As now made, electric cooking ranges, and the like, are commonly provided with resistors countersunk in supporting bases made of insulating material, which bases are substantially permanently attached to the frame of the range. It is usual to support the cooking vessel upon the said supporting base, and as the resistor is exposed, frequently the food undergoing cooking boils over and clogs up the base, and rapidly deteriorates the resistor. Furthermore, such bases are often broken by the utensil, and it is an important object of my invention to avoid breakage of said bases from this cause.

It is difficult to clean these bases, since they cannot be readily removed; and furthermore an unskilled person in cleaning the bases frequently breaks the resistor.

Now by means of my invention the bases carrying the resistor can be readily removed by an unskilled person for cleaning or replacement purposes. Frequently a resistor will break, and in time burn out, and the advantage of being able to replace the resistor without skilled assistance will be apparent to one skilled in the art.

At the outset it must be understood that the principles of my invention may be embodied for use in connection with a well-known type of electric heater which preferably embodies a parabolic reflector.

A is any suitable supporting member adapted to be provided with electrical connections, and this supporting member is suitably carried by the range. B is the resistor base made of any suitable material, such as porcelain: this base is adapted to have electrical connections, and these electrical connections are adapted to co-act with the electrical connections carried by the member A so that when necessary the base B may be readily removed from the supporting member A. As stated, both groups of electrical connections may be of any desired character, though the preferred construction is as follows: by means of screws C mounted in the lower portion of the base B, and extending into the bore D of said base, the arms E are coupled to said base and depend therebelow. The resistor may be in any form, and may be associated with the base B in any desired manner, the shape and construction of said base being immaterial. I show the resistor coupled by means of one end F to a binding screw G held in the bottom of the base B and extending through the arms E. The said base is shown as wired so as to provide for different temperatures, though of course the base may be wired for only one temperature. The member A is provided with passage-ways H in which are mounted electrical connections that co-act with the arms E; these electrical connections comprise a spring I integrally formed with plates J, and spaced apart therefrom for a certain distance so as to provide room to receive the arms E therebetween. The spring I and plates J are secured by any suitable means such as screws K to the member A, and by means of the binding screws L connection is had with the outside circuit represented by the wires M.

In order to prevent the placing of a base B in combination with a supporting member A, when the circuits are not of the same capacity, I provide what I term guard holes opening into the passage-ways H, and these guard holes can only receive arms E of the proper sizes. I prefer to locate these guard holes N in a guard plate O, made of any suitable insulating material, which plate is mounted over the top P of the member A. This plate is preferably provided with a flange Q which overlaps the sides of the top P and so prevents lateral displacement of said plate. The holes N are of course placed centrally in alignment with the passage-ways H as shown in Fig. 2, and in order to hold them in this position, and also to hold the plate O in association with the member A, any suitable means can be employed: the preferred means comprises a screw 2 having its head countersunk in the hole 3 formed in the top of the guard plate O. This screw extends through a passage-way formed in said member A, and on the lower threaded end thereof screws a nut 4. The preferred manner of supporting the member A from the range is as follows, though of course any desired way of supporting said member A may be provided without departing from the spirit of my invention: forming part of the member A is an annular flange 5, and this flange rests within the bowl 6 and upon the flange surrounding the passage-way or hole 7 formed in the bottom of said bowl. By means of screws 8 or their equivalents passing through holes formed in the flange 5, and through the flange surrounding the hole 7, said supporting member A is held in place.

8′ is the top of the range, and 9 is any suitable means adapted to support the cooking utensil: this means rests upon the formed-over edge 10 of the bowl 6, which rest upon the flange 11.

The bowl 6 is shown as made of an inner and outer shell 12 and 13, and the space therebetween is filled with any insulating material such as asbestos or mineral wool.

While any supporting means may be used to couple the supporting member A to the range, I prefer to use a bowl-shaped supporting means, and one more or less parabolic in shape, so that heat rays reflected therefrom will be more or less concentrated upon the centre of the bottom of the cooking utensil.

Another advantage derived from the use of the bowl 6 resides in the fact that material escaping from the cooking utensil will be collected therein and may be readily removed.

Obviously the plate O may be integrally formed with the supporting member A, though at the present time I believe it is cheaper to manufacture these two parts separately.

Though I prefer to combine with the base B and member A means functionally intermediate the electrical connections respectively of said parts, I do not confine myself to using such means which I have specifically embodied in the form of the guard plate O, because a cooking range or the like may be constructed to be used solely by skilled electricians who will not be liable to make mistakes in making proper electrical connections.

Obviously the supporting member for the base B and member A is preferably made so that heat rays cannot pass directly therethrough as would be the case were said supporting means provided with openings. The heat generated will not be permitted to escape from the chamber formed by the preferred form of supporting means, and will be directed to the bottom of the cooking utensil.

The supporting means 9 may be in the form of a grid, or it may be in the form of a sectional lid as shown in Fig. 1, which type of lid is very commonly used on cooking ranges.

While broadly speaking, the shape of the base B is immaterial, the frustum shape of this base is preferred, because it facilitates the concentration of the heat rays at the desired part of the bottom of the cooking utensil in combination with the sectional lid 9. By means of the central opening $a$ of the lid 9, the heat rays can be directed against the centre of the bottom of the cooking utensil, and by removing the required number of sections, the area of said bottom receiving the heat rays directly can be increased.

A considerable advantage is had by the use of a bowl-shaped member and the sectional lid shown, because the area against which the heat rays impinge on the bottom of the cooking utensil can be positively regulated.

While I prefer to make the base B removable, as disclosed, still it need not be made ordinarily removable when used in combination with the member 6 and a sectional lid, and located so that the cooking utensil will not be brought in contact therewith. The combination just set forth is a valuable one, even though the removable feature of the base B be not presented.

In all cases the member or bowl 6 should be shallow enough so that the top of the base B will be located a short distance below the grid or other supporting means 9, as this position of the base B, together with the relative shallowness of said bowl produces the highest efficiency.

It is of course self-evident that in place of making the bowl 6 as illustrated in Fig. 1, it may be made, as illustrated in Figs. 4 and 5, of refractory material, such as porcelain, and adapted to be associated with the base B and the cooking utensil.

While I have described what I consider to be the best embodiments within my invention, it must be understood that the principle thereof may be embodied in various other forms and I desire not to be limited beyond the requirements of the prior art and the terms of my claims.

What I claim is:

1. In an electric heat-generating appliance, in combination a member adapted to be supported by said appliance; a supporting member positioned in said member and adapted to be permanently coupled thereto; a resistor base, and electrical connections of the push-and-pull type associated with said supporting member and said base so that said base may be readily pulled away from said supporting member, for the purpose specified.

2. In a cooking range and the like, in combination a relatively shallow dish-shaped element adapted to be associated with said range, and provided with a passage-way formed in the bottom thereof; supporting means carried by said range and extending across the mouth of said member, and electric-heat generating means located in part in the passage-way formed in said bowl-shaped member and projecting thereabove with the top thereof located a short distance below said supporting means.

3. In an electric heat-generating appliance, in combination a relatively shallow dish-shaped member adapted to be associated with said appliance, and provided with a passage-way formed in the bottom thereof; a refractory supporting member having passage-ways extending longitudinally therethrough, and mounted in the passage-way formed in said dish-shaped member; electrical connections mounted in the passage-ways of said supporting member; a refractory resistor base having a passage-way extending therethrough, and electrical connection located at their inner ends within said passage-way and secured directly to the walls of said base and depending therebelow and adapted to engage with the electrical connections carried by said supporting member.

4. In a cooking range or the like, the combination with a range top, of a shallow dish-shaped element secured to said top, a supporting member mounted in said element, unequally spaced electrical connections carried by said supporting member, a resistor and base mounted upon said supporting member, electrical connector arms carried by said resistor base and adapted for contact with the unequally spaced connections carried by the supporting member, and means carried by the range top for partially closing the mouth of said dish-shaped element for concentrating the heat rays produced by said resistor.

5. In a cooking range or the like, the combination with a range top having an opening, of a dish-shaped element secured to said top and depending through said opening, a supporting member mounted in the lower portion of said element, unequally spaced electrical connections carried by said supporting member, a resistor and base mounted upon said supporting member and having its upper end terminating slightly below the mouth of said dish-shaped element, electrical connector arms carried by said resistor base and adapted for contact with the unequally spaced connections carried by the supporting member, and means carried by the range top for partially closing the mouth of said dish-shaped element for concentrating the heat rays produced by said resistor.

6. In a cooking range or the like, the combination with a range top having an opening, of a parabolic reflector secured to said top and extending through said opening, said reflector comprising inner and outer spaced shells with insulating material interposed therebetween, an electric heat generating element mounted within said reflector, and means carried by the range top for partially closing the mouth of said reflector for concentrating the heat rays produced by said generating element.

7. In a cooking range or the like, the combination with a range top having an opening, of a parabolic reflector secured to said top and extending through said opening, said reflector comprising an inner shell formed of refractory material, an outer shell carried in spaced relation to the inner shell, and heat insulating material interposed between said shells; an electric heat generating element mounted within said reflector, and means carried by the range top for partially closing the mouth of said reflector for concentrating heat rays produced by said generating element.

8. In a cooking range or the like, the combination with a range top having an opening, of a parabolic reflector secured to said top and depending through said opening, said reflector comprising an inner shell formed of refractory material, an outer shell carried in spaced relation to the inner shell, and heat insulating material interposed between said shells; a frustrum-shaped electric heat generating element mounted within said reflector, and means carried by the range top for partially closing the mouth of said reflector for concentrating the heat rays produced by said generating element.

9. In a cooking range or the like, the combination with a range top having an opening, of a parabolic reflector secured to said top and depending through said opening, said reflector comprising an inner shell formed of refractory material, an outer shell carried by the inner shell in spaced relation thereto, and heat insulating material interposed between said shells; a supporting member mounted in said reflector, unequally spaced electrical connections carried by said supporting members, a resistor and base mounted upon said supporting member, electrical connector arms carried by said resistor base and adapted for contact with the unequally spaced connections carried by the supporting base, and means carried by the range top for partially closing the mouth of said reflector for concentrating the heat rays produced by said resistor.

10. In a cooking range or the like, the combination with a range top having an opening, of a parabolic reflector secured to said top and depending through said opening, said reflector comprising an inner shell formed of refractory material, an outer shell carried in spaced relation to the inner shell, and heat insulating material interposed between said shells, a supporting member mounted in the lower portion of said reflector, unequally spaced electrical connections carried by said supporting member, a resistor and base mounted upon said supporting member and having its upper end terminating slightly below the mouth of said reflector, electrical connector arms carried by said resistor base and adapted for contact with the unequally spaced connections carried by the supporting member, and means carried by the range top for partially closing the mouth of said reflector for concentrating the heat rays produced by said resistor.

11. In a cooking range or the like, the combination with a range top, of a shallow dish-shaped element secured to said top, a supporting member mounted in said element, unequally spaced electrical connections carried by said supporting member, a resistor and base mounted upon said supporting member, electrical connector arms carried by said resistor base and adapted for contact with the unequally spaced connections carried by the supporting member, and a sectional lid carried by the range top for providing a variable closure for the mouth of said dish-shaped element for concentrating the heat rays produced by said resistor.

12. In a cooking range or the like, the combination with a range top having an opening, of a parabolic reflector secured to said top and depending through said opening, said reflector comprising inner and outer spaced shells with insulating material interposed therebetween, an electric heat generating element mounted within said reflector, and a sectional grid carried by the range top for providing a variable closure for the mouth of said reflector for concentrating the heat rays produced by said generating element.

13. In a cooking range or the like, the combination with a range top having an opening, of a parabolic reflector secured to said top and depending through said opening, said reflector comprising an inner shell formed of refractory material, an outer shell carried in spaced relation to the inner shell, and heat insulating material interposed between said shells; an electric heat generating element mounted within said reflector, and a sectional grid carried by the range top for providing a variable closure for the mouth of said reflector for concentrating the heat rays produced by said generating element.

ASHER PRITZKER.